(12) United States Patent
Jeon et al.

(10) Patent No.: US 10,037,248 B2
(45) Date of Patent: Jul. 31, 2018

(54) METHOD AND SYSTEM FOR MANAGING SECURE ELEMENT

(71) Applicant: SK C&C CO., LTD., Seongnam-si, Gyeonggi-do (KR)

(72) Inventors: Mi Suk Jeon, Seoul (KR); Kyong Gu Kang, Yongin-si (KR)

(73) Assignee: SK TELINK CO., LTD., Seoul (KR)

( * ) Notice: Subject to any disclaimer, the term of this patent is extended or adjusted under 35 U.S.C. 154(b) by 402 days.

(21) Appl. No.: 14/648,501

(22) PCT Filed: Nov. 27, 2013

(86) PCT No.: PCT/KR2013/010863
§ 371 (c)(1),
(2) Date: May 29, 2015

(87) PCT Pub. No.: WO2014/084608
PCT Pub. Date: Jun. 5, 2014

(65) Prior Publication Data
US 2015/0301897 A1  Oct. 22, 2015

(30) Foreign Application Priority Data

Nov. 29, 2012 (KR) .................. 10-2012-0137052

(51) Int. Cl.
*G06F 11/14* (2006.01)
*H04W 12/02* (2009.01)
(Continued)

(52) U.S. Cl.
CPC ........... *G06F 11/1448* (2013.01); *H04W 8/00* (2013.01); *H04W 12/02* (2013.01); *H04L 63/0428* (2013.01)

(58) Field of Classification Search
CPC ..... G06F 11/1448; H04W 8/00; H04W 12/02; H04L 63/0428
See application file for complete search history.

(56) References Cited

U.S. PATENT DOCUMENTS 8,060,449 B1 * 11/2011 Zhu ...................... G06Q 20/401
705/14.51
8,196,131 B1 * 6/2012 von Behren ......... G06Q 20/367
705/64
(Continued)

FOREIGN PATENT DOCUMENTS

EP    2 003 842 A1   12/2008
EP    2 073 484 A1    6/2009
(Continued)

OTHER PUBLICATIONS

International Search Report for PCT/KR2013/010863 dated Feb. 28, 2014 [PCT/ISA/210].
(Continued)

*Primary Examiner* — Hadi S Armouche
*Assistant Examiner* — Alexander R Lapian
(74) *Attorney, Agent, or Firm* — Sughrue Mion, PLLC

(57) ABSTRACT

A method for managing a secure element (SE) is disclosed. The method for managing the SE includes identifying secure information stored in the SE, sending a command to request to set suspension of use of a means of payment included in the secure information stored in the SE to a secure server, generating backup data using at least part of the identified secure information, transmitting the backup data from the SE to the secure server through a secure channel set between the secure server and the SE and storing the backup data, transmitting a restoration command on the secure information to the secure server, and restoring the backup data of the secure server to the SE or another SE.

17 Claims, 8 Drawing Sheets

(51) Int. Cl.
*H04W 8/00* (2009.01)
*H04L 29/06* (2006.01)

(56) References Cited

U.S. PATENT DOCUMENTS

| | | | | |
|---|---|---|---|---|
| 2006/0253904 | A1* | 11/2006 | Bhansali | G06F 21/572 |
| | | | | 726/13 |
| 2009/0276475 | A1* | 11/2009 | Ramsey | H04L 63/083 |
| 2012/0172026 | A1* | 7/2012 | Kwon | H04L 63/067 |
| | | | | 455/419 |
| 2012/0190354 | A1* | 7/2012 | Merrien | H04W 4/001 |
| | | | | 455/422.1 |

FOREIGN PATENT DOCUMENTS

| | | | |
|---|---|---|---|
| KR | 10-2005-0092420 A | 9/2005 | |
| KR | 10-2010-0011456 A | 2/2010 | |
| KR | 10-2011-0116095 A | 10/2011 | |
| KR | 10-1107850 B1 | 1/2012 | |
| WO | WO 2013101040 A1 * | 7/2013 | ............ G06Q 20/36 |

OTHER PUBLICATIONS

KIPO Office Action for Application No. 10-2012-0137052 dated Feb. 3, 2014.

\* cited by examiner

| Card Name | Type | Company | Card Number | Amount | ... |
|---|---|---|---|---|---|
| A | Credit | Woori bank | 1234-5678-7890-3214 | - | ... |
| B | Credit | Kookmin Bank | 2486-6842-4546-8462 | - | ... |
| C | Prepaid | Woori bank | 7531-1591-7586-9631 | 1,000,000 won | ... |
| D | Prepaid | Shinhan bank | 0108-5487-7706-8506 | 500,000 won | ... |
| E | Saving | MISSHA | 4518-4244-0014-8003 | 2000 points | ... |
| ... | ... | ... | ... | ... | ... |

FIG. 7

METHOD AND SYSTEM FOR MANAGING SECURE ELEMENT

CROSS REFERENCE TO RELATED APPLICATIONS

This application is a National Stage of International Application No. PCT/KR2013/010863, filed Nov. 27, 2013, claiming priority from Korean Patent Application No. 10-2012-0137052, filed Nov. 29, 2012, the contents of all of which are incorporated herein by reference in their entirety.

TECHNICAL FIELD

Methods and apparatuses consistent with exemplary embodiments relate to a method and system for managing an Secure Element (SE), and more particularly, to a method and system for safely backing up secure information of an SE in a terminal to a Trusted Service Manager (TSM), and then safely restoring the backed-up secure information to the SE in the terminal or another terminal.

BACKGROUND ART

As smart phones are increasingly used in recent years, a mobile payment service which combines communication and finance by adding a credit card function to an SE installed in a mobile phone is widely used.

Since such a mobile payment service provides the convergence of a communication service and a finance service, an intermediary for safely transmitting and managing information between a communication service provider and a finance service provider is required. A Trusted Service Manager (TSM) plays a role as an intermediary.

For the mobile payment service, the communication service provider and the finance service provider store customer information in an SE such as a USIM and an SD memory (external memory), and manage customers. Since the customer information is included in the SE, security should be considered as being important, and the TSM manages such an SE.

That is, since the TSM stores finance information directly related to personal payment in the SE in the terminal and manages the finance information, the role of the TSM is very important.

Meanwhile, the SE which contains important customer information may be divided into an external SE, such as a USIM and an SD memory, and an internal SE, such as an embedded SE, which is mounted in the terminal. However, there has been no technique for backing up the important information in the SE in the prior art. In the prior art, when the terminal or the external memory is replaced, the information in the SE is lost and thus the information should be newly installed, which may cause inconvenience.

Koran Patent Registration No. 1107850, titled "a transmission method, a transmission system, a TSM, a computer-readable medium, and a mobile phone," discloses a system and method for transmitting a service or an application provided from a service provider to a mobile phone, in which a memory device including a plurality of memory sectors protected against a disapproved access by an access key through a TSM is mounted.

However, since the above-described prior art describes only the function of the TSM to install card information and security and payment-related applications in the SE, the problems in the prior art that the information in the SD should be reset or should be newly installed when the SE or the terminal is replaced are not solved.

Therefore, there is a demand for a technique for safely backing up and managing information in an SE even when a terminal or the SE is replaced and update is performed.

DISCLOSURE

Technical Problem

To address the above-discussed deficiencies of the prior art, it is a primary aspect of the present disclosure to provide a method and system for managing an SE.

Another aspect of the present disclosure is to provide a method and system for safely backing up and restoring secure information of an SE.

Another aspect of the present disclosure is to provide a method and system for safely backing up secure information of an SE in a terminal to a secure server, and then safely restoring the backed-up secure information to the SE of the terminal or another terminal.

Another aspect of the present disclosure is to provide a method and system for integrating and managing a plurality of pieces of card information.

Technical Solution

According to one aspect of the present invention, a method for managing an SE includes: identifying secure information; generating backup data; transmitting the backup data to a secure server; and restoring the backup data to the SE or another SE.

The identifying the secure information may include, in response to a backup command on the secure information of the SE, identifying the secure information stored in the SE. The generating the backup data may include generating backup data using at least part of the identified secure information. The transmitting the backup data to the secure server may include setting a secure channel between the secure server and the SE, and transmitting the backup data from the SE to the secure server through the secure channel and storing the backup data. The restoring the backup data to the SE or another SE may include, in response to a restoration command on the secure information, restoring the backup data.

The generating the backup data may include: dividing the identified secure information into categories; generating backup data by extracting a card applet installation list from information divided into a card applet category and encrypting the card applet installation list; and generating backup data by extracting numerical data from the information divided into a numerical data category and encrypting the numerical data.

The generating the backup data may include generating backup data by encrypting data which is generated using at least part of the secure information using identification information of the user terminal.

The method may further include: receiving a backup command on secure information stored in an SE of a user terminal; setting a secure channel to an SE of the user terminal, and receiving backup data of at least part of the secure information through the set channel; receiving a restoration command on the secure information; and, in response to the restoration command, transmitting the backup data to the SE of the user terminal or another user terminal.

According to another aspect of the present invention, a system for managing an SE includes a secure information identification unit, a backup data generation unit, a backup unit, and a restoration unit.

The secure information identification unit may be configured to, in response to a backup command on secure information of an SE, identify the secure information stored in the SE. The backup data generation unit may be configured to generate backup data using at least part of the identified secure information. The backup unit may be configured to set a secure channel between a secure server (TSM) and the SE, and transmit the backup data from the SE to the secure server through the secure channel and store the backup data. The restoration unit may be configured to, in response to a restoration command on the secure information, restore the backup data of the secure server to the SE or another SE.

The backup data generation unit may be configured to divide the identified secure information into categories, generate backup data by extracting a card applet installation list from information divided into a card applet category and encrypting the card applet installation list; and generate backup data by extracting numerical data from the information divided into a numerical data category and encrypting the numerical data.

The backup data generation unit may be configured to generate backup data by encrypting data which is generated using at least part of the secure information using identification information of the user terminal.

The system may further include: a backup command reception unit configured to receive a backup command on secure information stored in an SE of a user terminal; a backup data reception unit configured to set a secure channel to an SE of the user terminal, and receive backup data of at least part of the secure information through the set channel; a restoration command reception unit configured to receive a restoration command on the secure information; and a data sending unit configured to, in response to the restoration command, transmit the backup data to the SE of the user terminal or another user.

Advantageous Effects

The present disclosure has an effect of more safely backing up and restoring secure information of an SE.

The present disclosure has an effect of safely backing up secure information of an SE in a terminal to a secure server, and then safely restoring the backed-up secure information to the SE of the terminal or another terminal.

The present disclosure has an effect of integrating and managing a plurality of pieces of card information.

The present disclosure can guarantee security against loss or damage of backup data by transmitting the backup data through a secure channel between an SE and a secure server.

The present disclosure has an effect of safely backing up and restoring secure information of an external SE (USIM, Micro-SD) as well as secure information of an embedded SE.

DESCRIPTION OD DRAWINGS

FIG. 7 is a view showing identified secure information in an SE according to an exemplary embodiment of the present disclosure.

BEST MODE

Hereinafter, exemplary embodiments of the present disclosure will be described with reference to the accompanying drawings. In the following description, detailed descriptions of well-known functions or configurations will be omitted since they would unnecessarily obscure the subject matters of the present invention. In explaining exemplary embodiments of the present disclosure, a specific numerical value is merely an example.

The present disclosure provides a method and system for managing information stored in an SE which is used in a mobile payment service.

A TSM stores finance information directly related to personal payment in an SE of a terminal and manages the finance information.

However, there has been no method for backing up the information stored in the SE in the prior art, and thus information should be installed again when the SE is updated or the terminal is replaced.

To solve this problem, the present disclosure provides a method and system for managing an SE, which generates backup data using secure information of an SE in a terminal, safely backs up the backup data through a secure channel formed between the SE and a TSM, that is, a secure server, and then safely restore the secure information to the SE in the terminal or another terminal when the SE is updated or the terminal is replaced.

Figure 6:
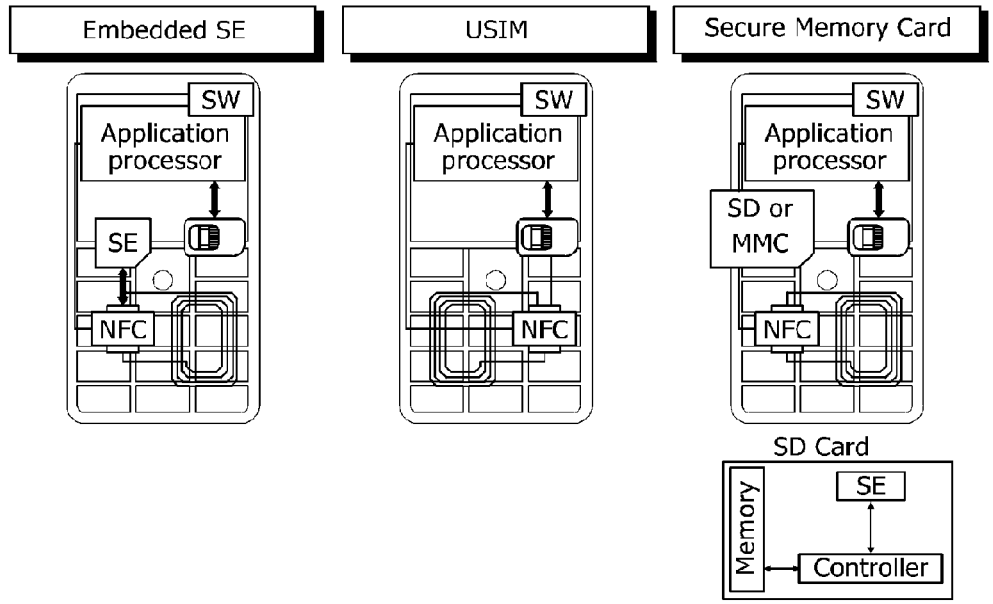
FIG. 6 is a view showing a characteristic of each type of SE according to an exemplary embodiment of the present disclosure.

The SE which is managed by the TSM is generally divided into three types of SEs, that is, a USIM, an embedded SE, and a micro-SD. Referring to FIG. 6, the three types of SEs will be explained in detail in view of their advantages and disadvantages.

The USIM, which is a subscriber identity module, extends the function of the SE to be used as a finance service providing chip. In this case, the SE provider may be a mobile network operator, and the USIM has an advantage of using the functions provided by existing mobile network operators, but its demerit is that the USIM is a model depending on the mobile network operators.

The embedded SE is an SE which is embedded in a terminal. In this case, the SE provider may be a mobile phone manufacturer or a platform provider (Google, Apple, etc.). The embedded SE has an advantage that a platform provider may be a core of a business, but has a disadvantage that the embedded SE is integrated into a terminal and thus is difficult to continuously use when a mobile phone is placed.

The micro-SD (Secure Memory Card) is a type of SD which is mounted in a memory card which is attachable/detachable to/from a terminal like the USIM. In this case, the SE provider may be a finance service provider. The micro-SD has an advantage that the finance service providers can easily issue their SEs, but is easily attachable/detachable and thus has difficulty in managing a relationship with the terminal.

As described above, there are three types of SEs, and the SE explained in the present disclosure is the embedded SE, but this should not be considered as limiting. The present disclosure is applicable to an external SE such as a USIM and a micro-SD.

In addition, the TSM corresponds to a secure server 120 of the present disclosure.

<Explanation of System>

Figure 1:
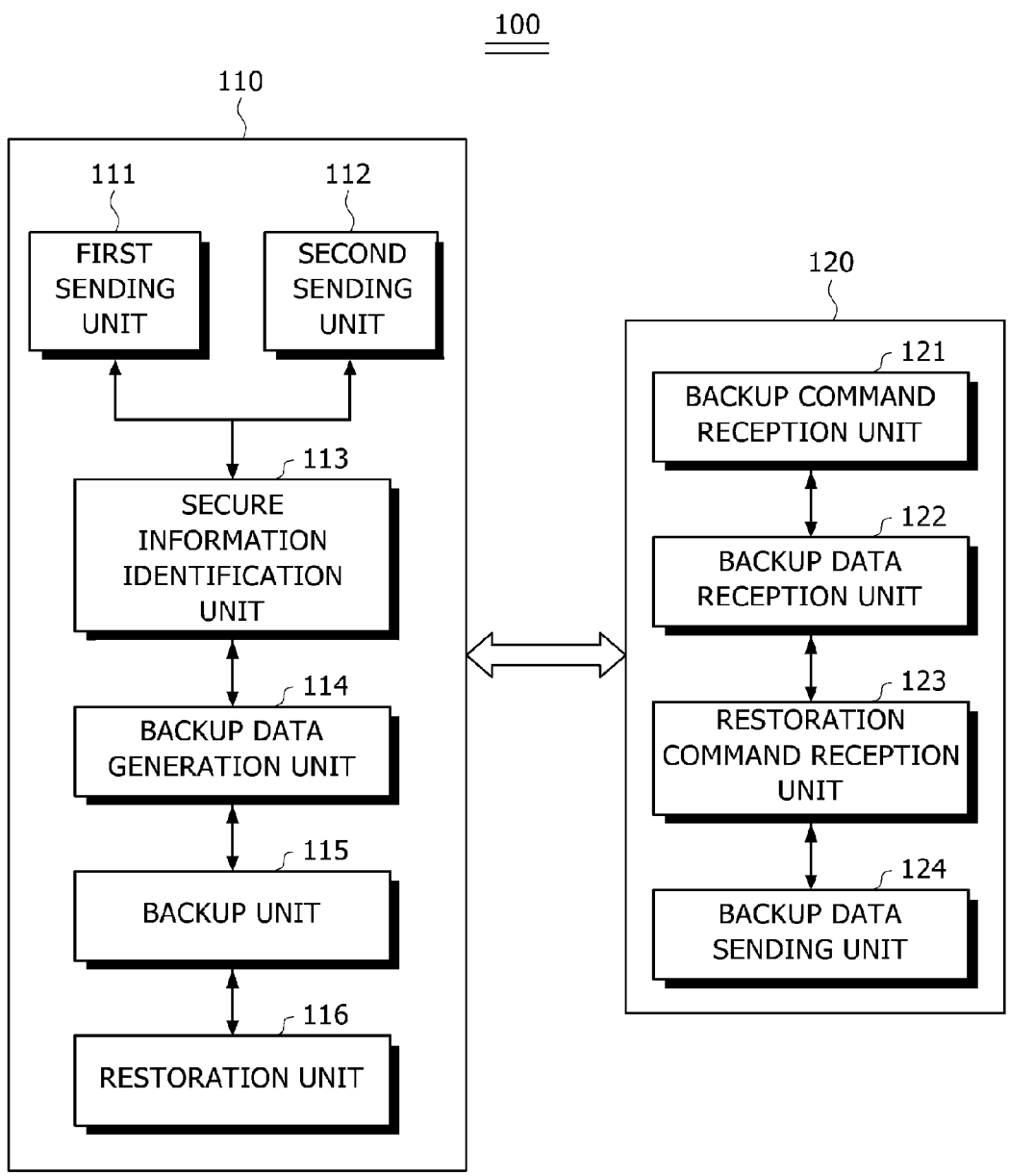
FIG. 1 is a view showing a schematic configuration of an SE management system of the present disclosure.

FIG. 1 is a view showing a schematic configuration of an SE management system of the present disclosure.

Referring to FIG. 1, the SE management system 100 according to the present disclosure includes an SE 110, a first sending unit 111, a second sending unit 112, a secure information identification unit 113, a backup data generation unit 114, a backup unit 115, a restoration unit 116, a secure server 120, a backup command reception unit 121, a backup data reception unit 122, a restoration command reception unit 123, and a backup data sending unit 124.

The SE 110 stores a variety of information such as personal information, applet information, mobile network operator information, and finance service information issued by the secure server 120. According to the present disclosure, the SE 110 generates backup data using information stored therein, and transmits the generated backup data to the secure server 120 through a secure channel set between the secure server 120 and the SE 110.

The secure information identification unit 113 identifies secure information in the SE in response to a backup command for the secure information of the SE. The secure information includes all kinds of information stored in the SE, such as information of card applets installed in a terminal, account information of a card such as a chargeable card (a prepaid card, Traffic money, etc.), mileage information of a point card, a serial number of a card, mobile network operator information, etc. FIG. 7 illustrates the identified secure information in the SE according to an exemplary embodiment of the present disclosure.

The backup command may be a backup command which is passively requested by the user, or may be a backup command which is requested in response to an update module of the SE 110 detecting the update of the SE 110. Alternatively, the backup command may be a backup command which is requested by the secure server 120 just in case.

The first sending unit 111 sends a command to request to set suspension of use of a means of payment (card) which is included in the secure information identified by the secure information identification unit 113. This is to safely back up and restore the data by suspending the card while the backup is being performed.

The second sending unit 112 sends a command to request to set the use of the means of payment included in the restored secure information after the terminal is upgraded or replaced and then the backup data is restored from the secure server 120.

The backup data generation unit 114 generates backup data using at least part of the secure information identified by the secure information identification unit 113. The backup data generation unit 114 divides the data into categories, card applets and numerical data, using the identified secure information.

In the category divided as card applets, the backup data generation unit 114 extracts only a card applet installation list on the installed cards (the extracted installation list information includes card applet information), and generates the backup data by encrypting the extracted list using identification information of the user terminal or user identification information (or a password separately set by the user, etc.)

On the other hand, in the category divided as numerical data, numerical data such as a balance of a prepaid card or a saved mileage score of a point card may be extracted. In this case, specific information on a corresponding card may also be extracted in addition to the numerical data. This is to restore the numerical data by matching what card is related to the numerical data when the backup data generated by extracting only the numerical data is restored. As described above, after the numerical data and the specific information of the corresponding card are extracted, backup data is generated by encrypting the extracted data and specific information of the corresponding card using identification information of the user terminal or user identification information (a password separately set by the user, etc.)

For example, when the secure information identified by the secure information identification unit 113 is as shown in FIG. 7, the backup data generation unit 114 extracts information indicating card names A, B, C, D, and E as the card applet list, and generates backup data by encrypting the extracted list using identification information of the user terminal or user identification information (or a password separately set by the user, etc.)

Meanwhile, numerical data such as 1,000,000 won, 500,000 won, or 2000 points may be extracted. In this case, characteristic information of a corresponding card indicated by the numerical data may also be extracted in addition to the numerical data. Therefore, information such as 1,000,000 won for the C card, 500,000 won for the D card, and 2000 points for the E card is extracted. The backup data is generated by encrypting the extracted numerical data and characteristic information of the corresponding card using identification information of the user terminal or user identification information (or a password separately set by the user, etc.)

The backup unit 115 transmits the backup data generated in the backup data generation unit 114 from the SE 110 to the secure server 120, and stores the backup data in the secure server 120. In this case, the backup data may be transmitted through a secure channel which is set between the secure server 120 and the SE 110. By allowing the backup data to be transmitted through the secure channel, security can be guaranteed and thus data loss or damage can be prevented when the secure information of the SE is backed up and restored.

The restoration unit 116 receives the backup data of the secure server 120 and restores the data in response to a restoration command on the secure information. The restoration command may be a restoration command which is requested in response to the update of the SE 110 being completed and then the update mode of the SE 110 detecting the update, or may be a restoration command which is passively requested by the user when the terminal is replaced or after the update of the SE 110 is completed. Alternatively, the restoration command may be a restoration request which is made by the secure server 120 in response to the update of the SE 110 being detected.

In addition, when the backup data is restored, it should be considered whether the backup data is restored to the SE of the user terminal where the backup data was generated, or to the SE of another terminal. In the case of the former, the backup data which was encrypted by the identification information of the user terminal is restored in the same terminal, and thus the restoration procedure proceeds without a problem. In the case of the latter, the backup data may not be restored to the backup data which was encrypted with the identification information of the user terminal since the terminal is different (when the terminal is replaced). To prepare for this case (restoration in another SE), not only the identification of the user terminal but also the user identification information (or a password separately set by the user, etc.) may be used when the backup data is encrypted.

In other words, when the backup data is generated using the secure information of the SE 110, the backup data may be generated by encrypting the backup data using the identification information of the user terminal or may be generated by encrypting the backup data using the user identification information (or a password separately set by the user, etc.)

When the restoration is performed in the SE of the user terminal where the backup data was generated, the backup data is restored to the backup data which was encrypted using the identification information of the user terminal, and, when the restoration is performed in the SE of another terminal (when the terminal is replaced), the backup data is restored to the backup data which was encrypted using the user identification information (or a password separately set by the user, etc.).

The secure server 120 corresponds to the above-described TSM, and receives the backup data transmitted from the SE 110. In addition, when the restoration command is received, the secure server 120 sends the backup data to the SE 110. In this case, the SE 110 may be the SE in the user terminal where the backup data information was generated, or may be a SE in another terminal (when the user replaces the mobile phone).

The backup command reception unit 121 may receive a backup command from the user or the update module of the SE 110. In other words, the backup command may be a backup command which is passively requested by the user, or may be a backup command which is requested in response to the update mode of the SE 110 detecting the update of the SE 110. Alternatively, the backup command may be a backup command which is requested by the secure server 120 just in case.

The backup data reception unit 122 may receive and store backup data of at least part of the secure information of the SE 110 transmitted from the backup unit 115 of the SE 110. In this case, the backup data is received through the secure channel which is set between the secure server 120 and the SE 110, so that security against loss or damage of the backup data can be guaranteed.

The restoration command reception unit 123 receives a restoration command from the user or the update module of the SE 110. In other words, the restoration command reception unit 123 may be a restoration command which is requested in response to the update of the SE 110 being completed and then the update module of the SE 110 detecting the update, or may be a restoration command which is passively requested by the user when the terminal is replaced or after the update of the SE 110 is completed. Alternatively, the restoration command may be a restoration request which is made by the secure server 120 in response to the update of the SE 110 being detected.

The backup data sending unit 124 sends the backup data to the SE 110 in response to the restoration command received from the restoration command reception unit 123. In this case, the backup data sending unit 124 sends the backup data through the secure channel which is set between the secure server 120 and the SE 110, so that security against loss or damage of the backup data can be guaranteed.

<Explanation of Method>

Figure 2:
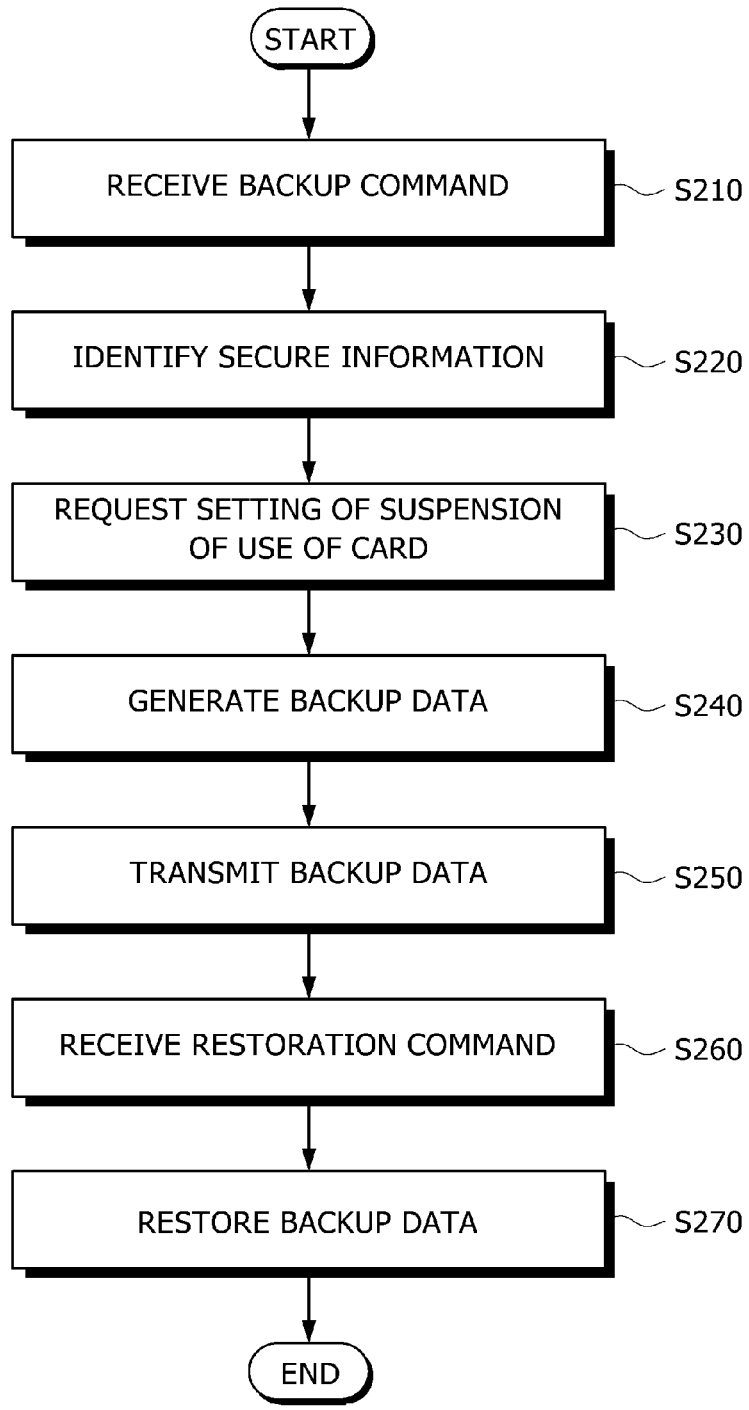
FIG. 2 is a view showing a flow of an SE of the present disclosure.

FIG. 2 illustrates an overall flowchart of a method for managing an SE, and the method will be explained by giving an order for the convenience of explanation.

1. Reception of Backup Command <S210>

In operation S210, a backup command is received from a user or the update module of the SE 110. The backup command may be a backup command which is passively requested by the user, or may be a backup command which is requested in response to the update module of the SE 110 detecting the update of the SE 110. Alternatively, the backup command may be a backup command which is requested by the secure server 120 just in case.

2. Identification of Secure Information <S220>

In operation S220, the secure information identification unit 113 identifies secure information in the SE 110 in response to operation S210. The secure information includes all kinds of information stored in the SE, such as information on card applets installed in the terminal, balance information of a card such as a chargeable card (a prepaid card, Traffic money, etc.), mileage information of a point card, a serial number of a card, mobile network operator information, etc.

3. Request for Setting of Suspension of Card <S230>

When the secure information in the SE 110 is identified in operation S220, the first sending unit 111 sends a command to request to set suspension of use of a means of payment (card) included in the identified secure information in operation S230. This is to safely back up and restore the data by suspending the card while backup is being performed.

4. Generation of Backup Data <S240>

In operation S240, backup data is generated using at least part of the secure information identified in operation S220 after the setting of the suspension of the use of the card is requested in operation S230. In this case, the backup data is generated through the operations shown in FIG. 3.

Operation S231 is for dividing the data into categories. Specifically, the data is divided into categories, a card applet and numerical data, using at least part of the secure information identified in operation S220.

Operation S232 is for extracting a card applet installation list and numerical data. In the category divided as the card applet, only the card applet installation list on installed cards is extracted, and, in the category divided as the numerical data, numerical data such as balance of a prepaid card or a mileage score of a point card is extracted. In this case, when the numerical data is extracted, specific information of a card corresponding to the numerical data may be extracted in addition to the numerical data. This is to restore the numerical data by matching what card is related to the numerical data.

In operation S233, the card applet installation list information and the numerical data (including specific information of the card corresponding to the numerical data) information are encrypted using identification information of the user terminal or user identification information (or a password separately set by the user, etc.)

In operation 240, backup data on the information encrypted in operation S233 is generated. The backup data which is encrypted using the identification information of the user terminal is used when the data is restored in the SE 110 in the user terminal, and the backup data which is encrypted using the user identification information (or a password separately set by the user, etc.) is used when the data is restored in the SE in another terminal (when the terminal is replaced).

5. Transmission of Backup Data <250>

In operation S250, the backup data generated in operation S240 is transmitted from the SE 110 to the secure server 120 and stored in the secure server 120. In this case, the backup data is transmitted to the secure server 120 through the secure channel which is set between the secure server 120 and the SE 110, so that security against loss or damage of the backup data can be guaranteed.

After operation S250, the terminal or the SE may be replaced or the SE may be updated.

6. Reception of Restoration Command <S260>

In operation S260, the restoration command reception unit 123 receives a restoration command from the user or the update module of the SE 110. The restoration command may be a restoration command which is requested in response to the update of the SE 110 being completed and then the update module of the SE 110 detecting the update, or may be a restoration command which is passively requested by the user when the terminal is replaced or after the update of the SE 110 is completed. In addition, the restoration command may be a restoration request which is made by the secure server 120 in response to the update of the SE 110 being detected.

7. Restoration of Backup Data <S270>

In operation S270, the backup data is received through the secure channel which is set between the secure server 120 and the SE 110 in response to the restoration command received in operation S260, and then is restored. As described briefly in the explanation of operation S240, the restoring operation may be divided into a restoring operation in the SE of the terminal where the backup data was generated, and a restoring operation in the SE of another terminal.

In the case of the former, the backup data which was encrypted using the identification information of the user terminal is received from the secure server 120 and is restored. On the other hand, in the case of the latter, the backup data which was encrypted using the user identification information (or a password separately set by the user, etc.) is received from the secure server 120 and restored.

Figure 4:
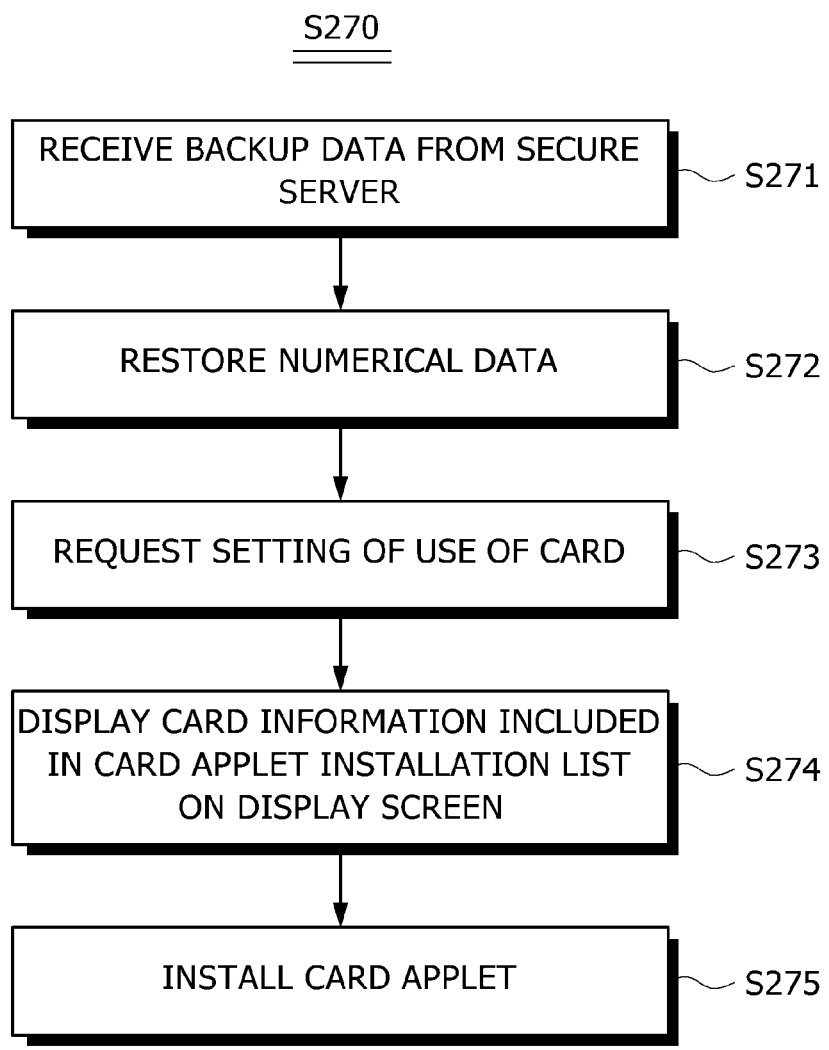
FIG. 4 is a flowchart showing a process of restoring backup data according to an exemplary embodiment of the present disclosure.

Operation S270 will be explained below with reference to FIG. 4. The operations illustrated in FIG. 4 are applicable to both the restoring operation in the SE of the user terminal and the restoring operation in the SE of another terminal.

In operation S271, the backup data is received from the secure server 120. That is, the card applet installation list information and the numerical data (including specific information of a card corresponding to the numerical data) information, which are the backup data, are received.

Operation S272 is for restoring the numerical data. Specifically, the numerical data is restored based on the card applet installation list information of the backup data received in operation S271. Since the numerical data includes the specific information on the card corresponding to the numerical data, the numerical data of the corresponding card may be restored based on the card applet installation list.

In operation S273, the second sending unit 112 sends the secure sever 120 a command to request to set use of a means of payment (card) included in the restored secure information based on the data restored in operation S272.

Figure 8:
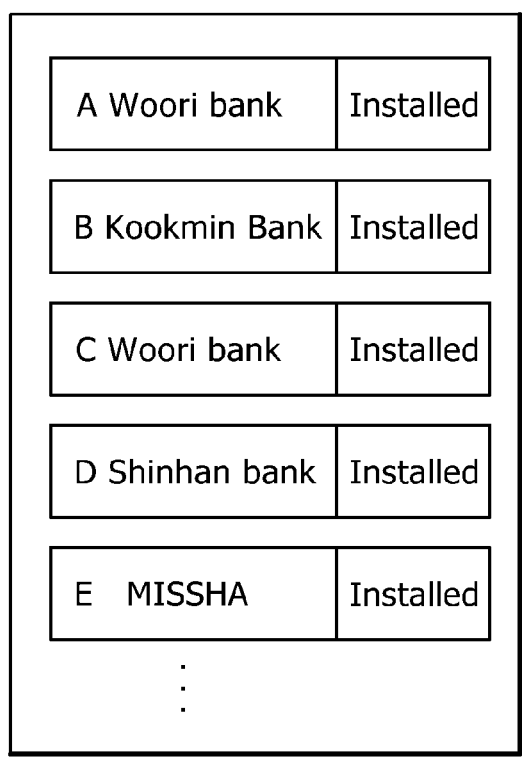
FIG. 8 is a view showing information which is displayed on a display screen according to an exemplary embodiment of the present disclosure.

In operation S274, the information of the card included in the card applet installation list is displayed on a display screen. In other words, in operation S274, the installation list card information including the information of the card the numerical data of which is restored in operation S272 is displayed on the display screen. FIG. 8 illustrates an exemplary embodiment of the information displayed on the display screen.

In operation S275, a card applet is installed. Specifically, only a card which is needed by the user is selected from the plurality of pieces of card information displayed on the display screen in operation S274, and, in response to a user input, the secure server 120 issues a service (a finance service such as a credit card, etc.) on the card information selected by the user to the SE 110, and the SE 110 installs this service.

Figure 3:
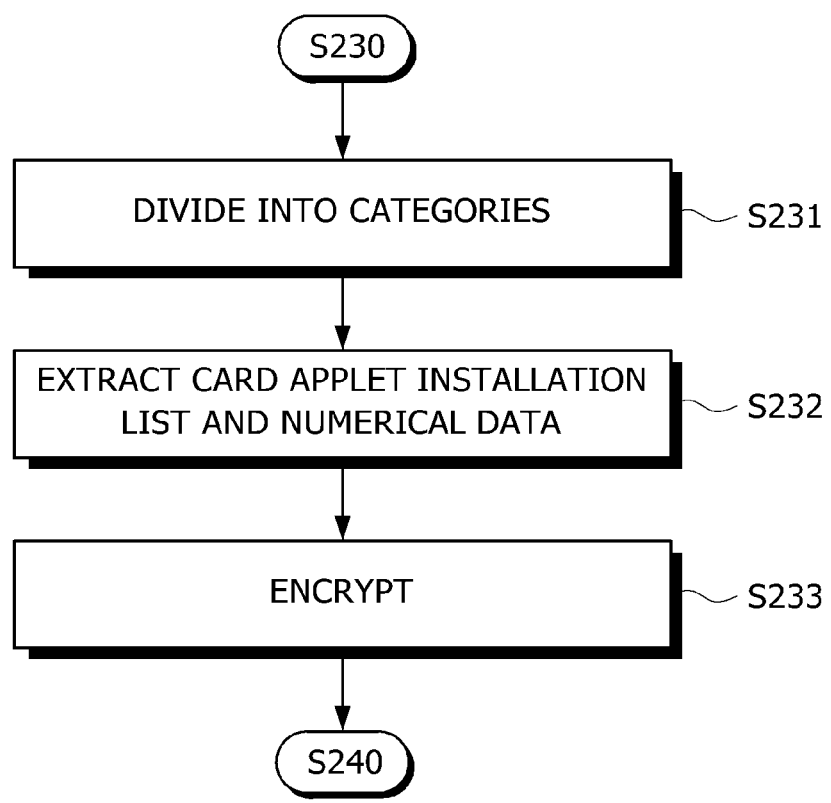
FIG. 3 is a flowchart showing a process of generating backup data according to an exemplary embodiment of the present disclosure.
Figure 5:
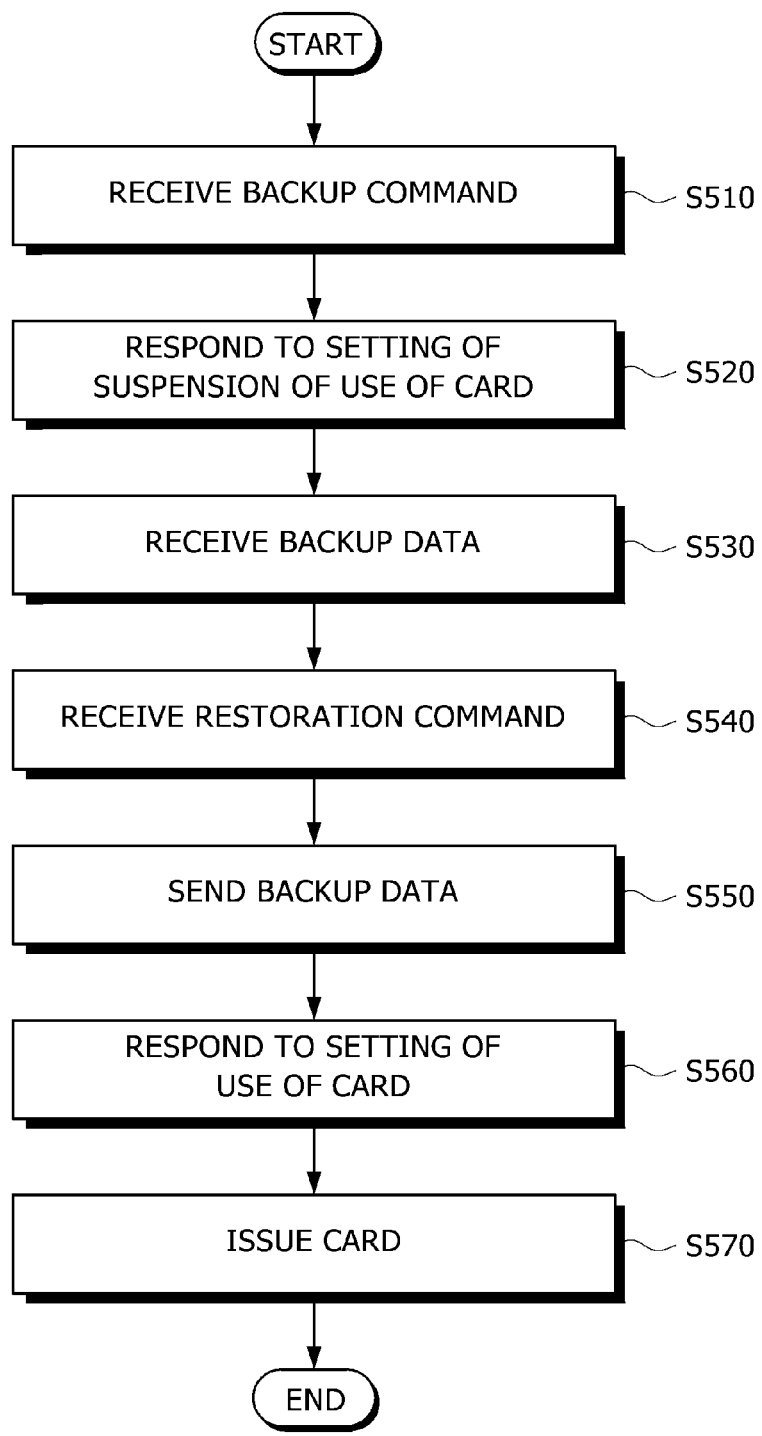
FIG. 5 is a view showing a flow in a secure server of the present disclosure.

The operations explained with reference to FIGS. 2 to 4 are the operations which are performed in view of the SE 110 according to an exemplary embodiment of the present disclosure. Hereinafter, a flow of the operations in view of the secure server 120 according to an exemplary embodiment of the present disclosure will be explained with reference to FIG. 5.

Operation S510 is for receiving a backup command. The backup command may be a backup command which is passively requested by the user, or may be a backup command which is requested in response to the update module of the SE 110 detecting the update of the SE 110. Alternatively, the backup command may be a backup command which is requested by the secure server 120 just in case.

Operation S520 is for responding to setting of suspension of use of a card. Specifically, the secure server 120 receives a card suspension setting request sent from the first sending unit 111 in operation S230, and locks the service not to use the means of payment included in the secure information identified by the SE 110.

Operation S530 is for receiving backup data. Specifically, the secure server 120 receives the backup data which is sent from the backup unit 115 of the SE 110 in operation S250. The backup data is received through the secure channel which is set between the secure server 120 and the SE 110.

Operation S540 is for receiving a restoration command. Specifically, the restoration command may be a restoration command which is detected in response to the update of the SE 110 being completed and the update module of SE 110 detecting the update, or may be a restoration command which is passively requested by the user.

Operation S550 is for sending backup data. Specifically, in response to the restoration command received in operation S540, the backup data is sent to the SE 110. In this case, the backup data is sent through the secure channel which is set between the secure server 120 and the SE 110. In addition, the backup data in the secure server 120 may be sent to the SE 110 of the user terminal where the backup data was generated, or may be sent to the SE in another terminal.

Operation S560 is for responding to setting of use of the card. Specifically, when the backup data is sent to the SE 110 in operation S550, the restoration unit 116 of the SE 110 receives the backup data and restores the backup data. In this case, in operation S273, the second sending unit 112 of the SE 110 sends a command to request to set use of a means of payment included in the secure information restored based on the received backup data. Accordingly, the SE 120 unlocks to allow the means of payment included in the restored secure information to be used in response to the request for the setting of the use of the card, and the service of the payment card locked in operation S520 is reactivated.

Operation S570 is for issuing a service. Specifically, when the user selects a card in operation S275, the secure server 120 issues the service for the card selected by the user to the SE 110.

The method for managing the SE according to exemplary embodiments of the present invention may be implemented in the form of a program command which may be performed through various computing means, and may be recorded on a computer-readable medium. The computer-readable medium may include program commands, data files, and data structures either alone or in combination. The program commands recorded on the medium may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floppy disks, and hardware devices such as ROMs, RAMs and flash memories that are especially configured to store and execute program commands. Examples of the program commands include machine language codes created by a compiler, and high-level language codes that can be executed by a computer by using an interpreter. The above-mentioned hardware devices may be configured to operate as one or more software modules to perform the operations of the present disclosure, and vice versa.

Although specific matters such as detailed construction and elements have been described with reference to exemplary embodiments and drawings, it should be understood that they are provided to assist in a comprehensive understanding of the exemplary embodiments. In addition, it will be understood by those skilled in the art that various changes in form and details may be made therein without departing from the spirit and scope of the invention as defined by the appended claims.

Therefore, the scope of the invention is defined not by the detailed description of the invention but by the appended claims, and all differences within the scope will be construed as being included in the present invention.

The invention claimed is:

1. A method for managing a secure element (SE) in a user terminal, comprising:
in response to the user terminal receiving a backup command on secure information stored in the SE from a user of the user terminal, identifying, by the user terminal, the secure information stored in the SE;
sending, by the user terminal, a command to request to set suspension of use of a means of payment included in the secure information stored in the SE to a secure server;
generating, by the user terminal, backup data using at least part of the identified secure information after the command to request to set the suspension of use of the means of payment is sent to the secure server;
transmitting, by the user terminal, the backup data from the SE to the secure server through a secure channel set between the secure server and the SE and storing the backup data;
in response to an update of the SE being completed and detected by the user terminal, transmitting, by the user terminal, a restoration command on the secure information to the secure server; and
in response to the restoration command on the secure information being transmitted by the user terminal, restoring the backup data of the secure server to the SE or another SE,
wherein the restoring the backup data comprises sending, by the user terminal, a command to request to set use of the means of payment included in the secure information stored in the SE based on the backup data to the secure server.

2. The method of claim 1, wherein the generating the backup data comprises:
dividing the identified secure information into categories; and
generating the backup data according to a backup method for each category.

3. The method of claim 2, wherein the generating the backup data comprises generating, as backup data, a card applet installation list including card applet information of information which is divided into a card applet category from among the identified secure information, and
wherein the restoring comprises controlling to install the card applet in the SE or another SE based on the card applet installation list included in the backup data.

4. The method of claim 3, wherein the restoring comprises: displaying card information included in the card applet installation list on a display screen, and installing a card applet selected in response to a selection input of the user in the SE or another SE.

5. The method of claim 2, wherein the generating the backup data comprises generating, as backup data, numerical data of information which is divided into a numerical data category from among the identified secure information, and
wherein the restoring comprises storing the numerical data included in the backup data in the SE or another SE.

6. The method of claim 1, wherein the generating the backup data comprises generating backup data by encrypting the at least part of the secure information using identification information of the user terminal and identification information of the user of the user terminal.

7. The method of claim 1, wherein each of the SE and the another SE is an embedded SE.

8. A method for managing a secure element (SE) in a user terminal, comprising:
receiving, by a secure server, a backup command on secure information stored in the SE of the user terminal, the backup command being received by the user terminal from a user of the user terminal;
receiving, by the secure server, a command to request to set suspension of use of a means of payment included in the secure information stored in the SE of the user terminal from the user terminal; and
receiving, by the secure server, backup data of at least part of the secure information from the user terminal through a secure channel set between the SE of the user terminal and the secure server after the command to request to set the suspension of use of the means of payment is received from the user terminal;
receiving, by the secure server, a restoration command on the secure information which is transmitted from the user terminal in response to an update of the SE being completed and detected by the user terminal;
in response to the restoration command being received by the secure server, transmitting, by the secure server, the backup data to the SE of the user terminal or another user terminal; and receiving, by the secure server, a command to request to set use of the means of payment included in the secure information stored in the SE of the user terminal based on the backup data from the user terminal.

9. A non-transitory computer-readable recording medium which records a program for executing a method for managing a secure element (SE) in a user terminal, the method comprising:

in response to the user terminal receiving a backup command on secure information stored in the SE from a user of the user terminal, identifying, by the user terminal, the secure information stored in the SE;

sending, by the user terminal, a command to request to set suspension of use of a means of payment included in the secure information stored in the SE to a secure server;

generating, by the user terminal, backup data using at least part of the identified secure information after the command to request to set the suspension of use of the means of payment is sent to the secure server;

transmitting, by the user terminal, the backup data from the SE to the secure server through a secure channel set between the secure server and the SE and storing the backup data;

in response to an update of the SE being completed and detected by the user terminal, transmitting, by the user terminal, a restoration command on the secure information to the secure server; and in response to the restoration command on the secure information being transmitted by the user terminal, restoring the backup data of the secure server to the SE or another SE, wherein the restoring the backup data comprises sending, by the user terminal, a command to request to set use of the means of payment included in the secure information stored in the SE based on the backup data to the secure server.

10. A system for managing a secure element (SE) in a user terminal, comprising:

a processor; and a memory storing instructions executable by the processor, wherein the processor is configured to:

in response to the user terminal receiving a backup command on secure information stored in the SE from a user of the user terminal, identify, by the user terminal, the secure information stored in the SE;

send, by the user terminal, a command to request to set suspension of use of a means of payment included in the secure information stored in the SE to a secure server;

generate, by the user terminal, backup data using at least part of the identified secure information after the command to request to set the suspension of use of the means of payment is sent to the secure server;

transmit, by the user terminal, the backup data from the SE to the secure server through a secure channel set between the secure server and the SE to store the backup data;

in response to an update of the SE being completed and detected by the user terminal, transmit, by the user terminal, a restoration command on the secure information to the secure server;

in response to the restoration command on the secure information being transmitted by the user terminal, restore the backup data of the secure server to the SE or another SE; and send, by the user terminal, a command to request to set use of the means of payment included in the secure information stored in the SE based on the backup data to the secure server.

11. The system of claim 10, wherein the processor is further configured to divide the identified secure information into categories, and generate the backup data according to a backup method for each category.

12. The system of claim 11, wherein the processor is further configured to generate, as backup data, a card applet installation list including card applet information of information which is divided into a card applet category from among the identified secure information, and to control to install the card applet in the SE or another SE based on the card applet installation list included in the backup data.

13. The system of claim 12, wherein the processor is further configured to display card information included in the card applet installation list on a display screen, and install a card applet selected in response to a selection input of the user in the SE or another SE.

14. The system of claim 11, wherein the processor is further configured to generate, as backup data, numerical data of information which is divided into a numerical data category from among the identified secure information, and to store the numerical data included in the backup data in the SE or another SE.

15. The system of claim 10, wherein the processor is further configured to generate backup data by encrypting the at least part of the secure information using identification information of the user terminal and identification information of the user of the user terminal.

16. The system of claim 10, wherein each of the SE and the another SE is an embedded SE.

17. A system for managing a secure element (SE) in a user terminal, comprising:

a processor; and a memory storing instructions executable by the processor, wherein the processor is configured to:

receive, by a secure server, a backup command on secure information stored in the SE of the user terminal from the user terminal, the backup command being received by the user terminal from a user of the user terminal;

receive, by the secure server, a command to request to set suspension of use of a means of payment included in the secure information stored in the SE from the user terminal;

receive, by the secure server, backup data of at least part of the secure information through a secure channel set between the SE of the user terminal and the secure server after the command to request to set the suspension of use of the means of payment is received from the user terminal;

receive, by the secure server, a restoration command on the secure information which is transmitted by the user terminal in response to an update of the SE being completed and detected by the user terminal;

in response to the restoration command being received by the secure server, transmit, by the secure server, the backup data to the SE of the user terminal or another user terminal; and receive, by the secure server, a command to request to set use of the means of payment included in the secure information stored in the SE based on the backup data from the user terminal.

* * * * *